(12) United States Patent
Lara-Gutierrez et al.

(10) Patent No.: US 11,468,794 B2
(45) Date of Patent: Oct. 11, 2022

(54) TRAINING MANIKIN AND SYSTEMS AND METHODS OF USING SAME

(71) Applicant: United States Government as Represented by the Department of Veterans Affairs, Washington, DC (US)

(72) Inventors: Jorge Lara-Gutierrez, Pittsburgh, PA (US); Patrick Martino, Pittsburgh, PA (US); Eric A. Heckenbach, Pittsburgh, PA (US); Mary Ellen Elias, Pittsburgh, PA (US); Dave Sullivan, Pittsburgh, PA (US)

(73) Assignee: United States Government as Represented by the Department of Veterans Affairs, Washington, DC (US)

( * ) Notice: Subject to any disclaimer, the term of this patent is extended or adjusted under 35 U.S.C. 154(b) by 21 days.

(21) Appl. No.: 17/084,852

(22) Filed: Oct. 30, 2020

(65) Prior Publication Data

US 2021/0134187 A1 May 6, 2021

Related U.S. Application Data

(60) Provisional application No. 62/928,517, filed on Oct. 31, 2019.

(51) Int. Cl.
*G09B 23/30* (2006.01)
*G09B 23/34* (2006.01)

(52) U.S. Cl.
CPC ............ *G09B 23/303* (2013.01); *G09B 23/34* (2013.01)

(58) Field of Classification Search
CPC .................................................. G09B 23/303
See application file for complete search history.

(56) References Cited

U.S. PATENT DOCUMENTS

| 5,853,292 A * | 12/1998 | Eggert | G09B 23/30 434/262 |
| 11,087,641 B1 * | 8/2021 | Khachatryan | G09B 23/34 |
| 2020/0211419 A1 * | 7/2020 | Hiyama | G09B 23/28 |

\* cited by examiner

*Primary Examiner* — Kesha Frisby
(74) *Attorney, Agent, or Firm* — Ballard Spahr LLP

(57) ABSTRACT

A training manikin can have a front, a longitudinal axis, and a sagittal axis perpendicular to the longitudinal axis. The training manikin can comprise a head portion having an oral aperture. A simulated esophagus can be in communication with the oral aperture of the head portion. The simulated esophagus can be configured to receive a gastrointestinal tube. A simulated larynx can be positioned between the simulated esophagus and the front of the manikin relative to the sagittal axis. A reservoir can be configured to receive a liquid. A conduit in communication with the reservoir, can have an outlet end that is positioned proximate to the oral aperture of the head portion. A pump can be positioned between, and in communication with, the reservoir and the conduit and configured to begin pumping the liquid from the reservoir to the outlet end of the conduit upon a first condition.

20 Claims, 16 Drawing Sheets

TRAINING MANIKIN AND SYSTEMS AND METHODS OF USING SAME

CROSS-REFERENCE TO RELATED APPLICATION

This application claims priority to and the benefit of U.S. Provisional Patent Application No. 62/928,517, filed Oct. 31, 2019, which is hereby incorporated herein by reference in its entirety.

BACKGROUND

Variceal hemorrhage is a severe condition that can result in hematemesis (the vomiting of blood). Treating the condition requires knowledge of special equipment, such as a Minnesota tube, which has an esophageal aspiration port, a gastric aspiration port, an inflatable gastric balloon, and an inflatable esophageal balloon (along with corresponding internal channels (lumens)). Moreover, hematemesis can be an alarming condition, and training in a simulated environment can prepare medical professionals for such an emergency. Thus, a need exists for a training apparatus that enables medical professionals to practice with the special equipment under simulated hematemesis conditions.

SUMMARY

Described herein, in various aspects, is a training manikin that can have a front, a longitudinal axis, and a sagittal axis perpendicular to the longitudinal axis. The training manikin can comprise a head portion having an oral aperture. A simulated esophagus can be in communication with the oral aperture of the head portion. The simulated esophagus can be configured to receive a gastrointestinal tube. A simulated larynx can be positioned between the simulated esophagus and the front of the manikin relative to the sagittal axis. A reservoir can be configured to receive a liquid. A conduit can be in communication with the reservoir. The conduit can have an outlet end. The outlet end of the conduit can be positioned proximate to the oral aperture of the head portion. A pump can be positioned between, and in communication with, the reservoir and the conduit. The pump can be configured to pump the liquid from the reservoir to the outlet end of the conduit. The pump can be configured to begin pumping upon a first condition.

The training manikin can further comprise a mesh disposed at the outlet end of the conduit.

The oral aperture of the head portion can define a simulated throat. The outlet end of the conduit can be positioned at a back of the simulated throat.

The outlet end of the conduit can be positioned at a side of the oral aperture.

The conduit can comprise a tube that is sufficiently flexible so that inflation of the gastrointestinal tube inhibits flow of the liquid.

The training manikin can further comprise the liquid within the reservoir. The liquid can be simulated blood.

The pump can have a flow rating of at least 250 gallons per minute and a minimum power of at least 0.75 horsepower.

The pump can have a flow rating of about 337 gallons per minute and a power output of about one horsepower.

The training manikin can further comprise teeth disposed within the oral aperture of the head portion.

The training manikin can further comprise a receiver. The receiver can be configured to receive a signal from a control module. The first condition can be a first user-initiated signal from the control module.

The pump can be configured to terminate pumping upon a second condition.

The second condition can be a second user-initiated signal from the control module.

The receiver can be a wireless receiver.

The receiver can be a wired receiver.

At least a portion of the manikin can be repurposed from a CPR training manikin.

The training manikin can further comprise a torso portion. The simulated esophagus, the reservoir, and the pump can be disposed within the torso portion.

The training manikin can further comprise at least one arm that is attached to the torso. The at least one arm can be configured to receive an IV.

The simulated esophagus and the simulated larynx can both be portions of a simulated airway. The simulated airway can further comprise at least one bronchial tube.

The training manikin of claim 18, further comprising at least one simulated lung in communication with the at least one bronchial tube of the simulated airway.

A system can comprise a manikin and a control module in communication with the receiver of the manikin.

The control module can comprise at least one input device that is configured to initiate the first user-initiated signal from the control module.

A method can comprise: upon the first condition, using the pump to pump liquid from the reservoir to the outlet end of the conduit, and advancing a gastrointestinal tube within the simulated esophagus.

The gastrointestinal tube can be a Minnesota tube.

The liquid can be pumped in a manner to simulate vomiting of blood.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein.

DETAILED DESCRIPTION

Figure 1:
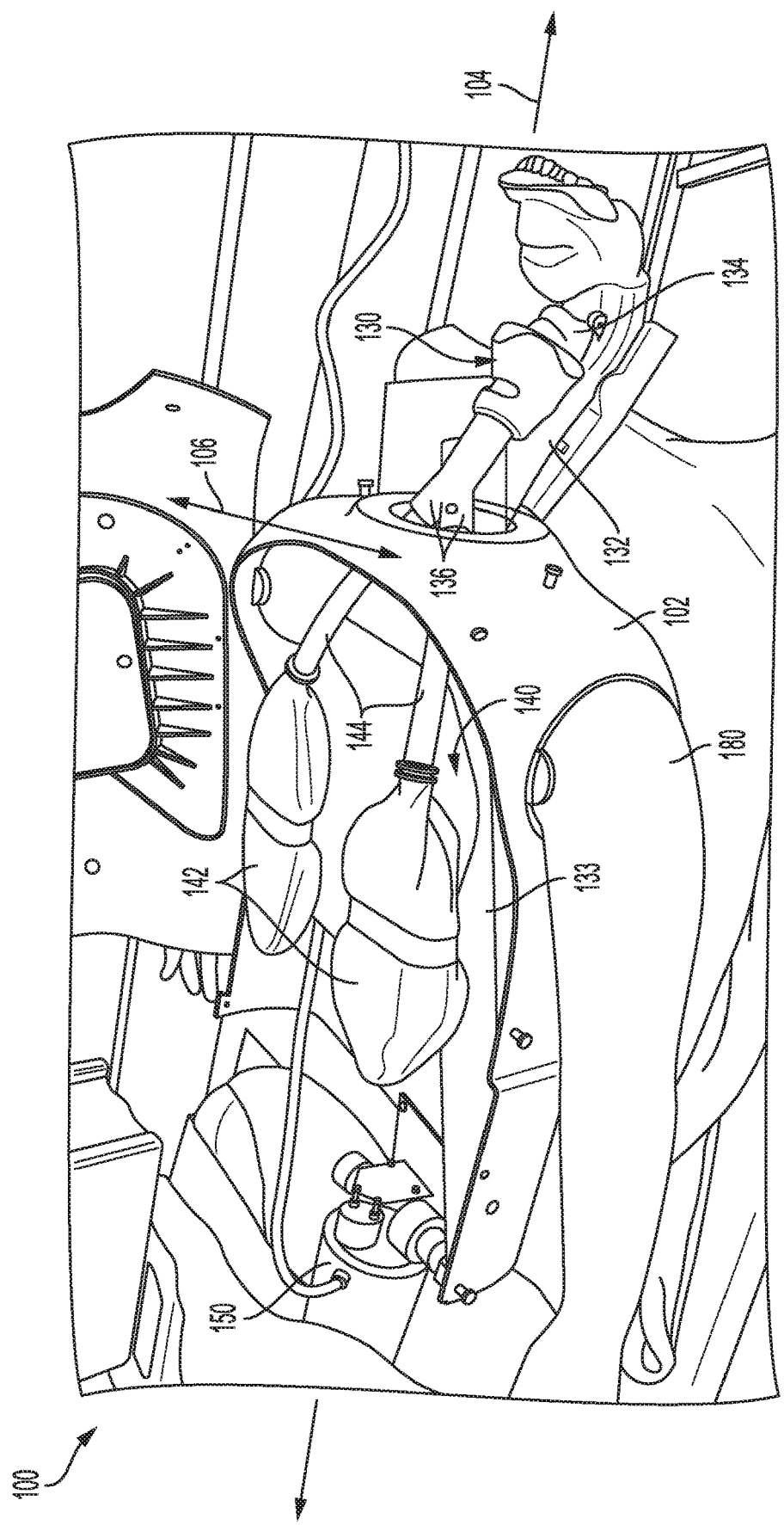
FIG. 1 is a perspective view of a portion of a manikin in accordance with embodiments disclosed herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a conduit" can refer to one or more of such conduits, and so forth.

All technical and scientific terms used herein have the same meaning as commonly understood to one of ordinary skill in the art to which this invention belongs unless clearly indicated otherwise.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of." For example, "at least one of A, B and C" explicitly includes only A, only B, only C, and combinations of each.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about" or "substantially," it is contemplated that values within up to 15%, up to 10%, up to 5%, or up to 1% (above or below) of the particularly stated value can be included within the scope of those aspects.

The word "or" as used herein means any one member of a particular list and also includes any combination of members of that list.

When used herein to refer to a structure or composition, the term "simulated" refers to a physical structure or composition having similar properties to the structure or composition that is being simulated. Thus, for example, simulated blood has similar properties (e.g., a similar color and consistency) to real blood, and a simulated esophagus has similar properties (e.g., a similar structure) to a real esophagus.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

Figure 2:
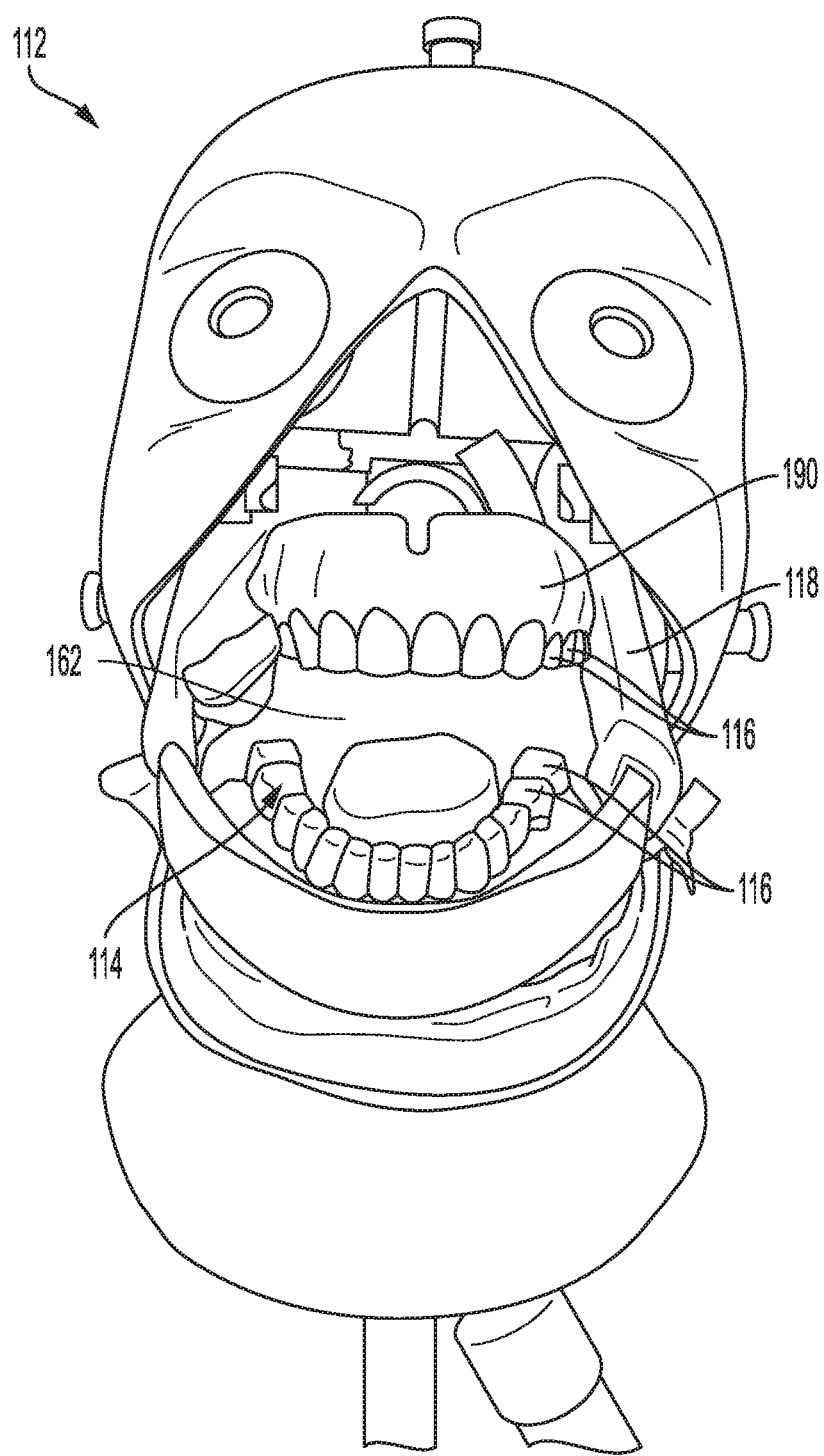
FIG. 2 is a perspective view of a head of a manikin in accordance with embodiments disclosed herein.
Figure 3:
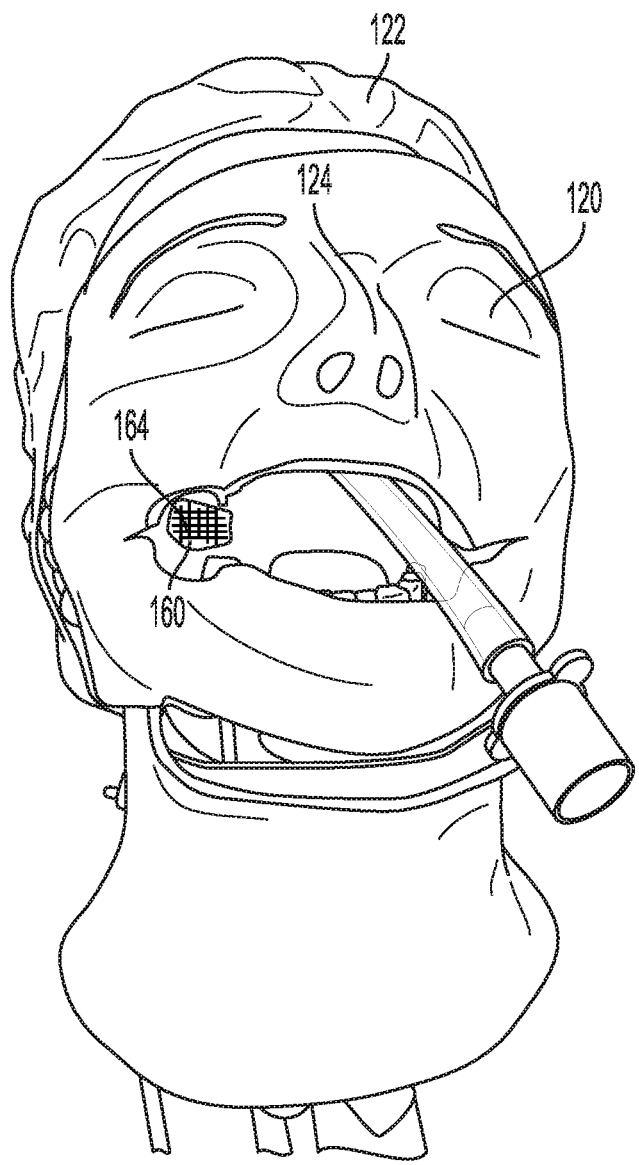
FIG. 3 is a perspective view of the head of FIG. 2 with a face cover.

Disclosed herein, in various aspects and with reference to FIGS. 1-3, is a training manikin 100 for training a medical professional under emergency conditions, such as hematemesis conditions. The training manikin 100 can have a front 102, a longitudinal axis 104, and a sagittal axis 106. The training manikin 100 can comprise a head portion 112 having an oral aperture 114. Optionally, the oral aperture 114 can comprise simulated teeth 116 set in a simulated jaw 118. Optionally, the head portion 112 can further comprise simulated eyes 120, simulated hair (or a hair-shaped component 122), and/or a simulated nose 124.

Figure 6:
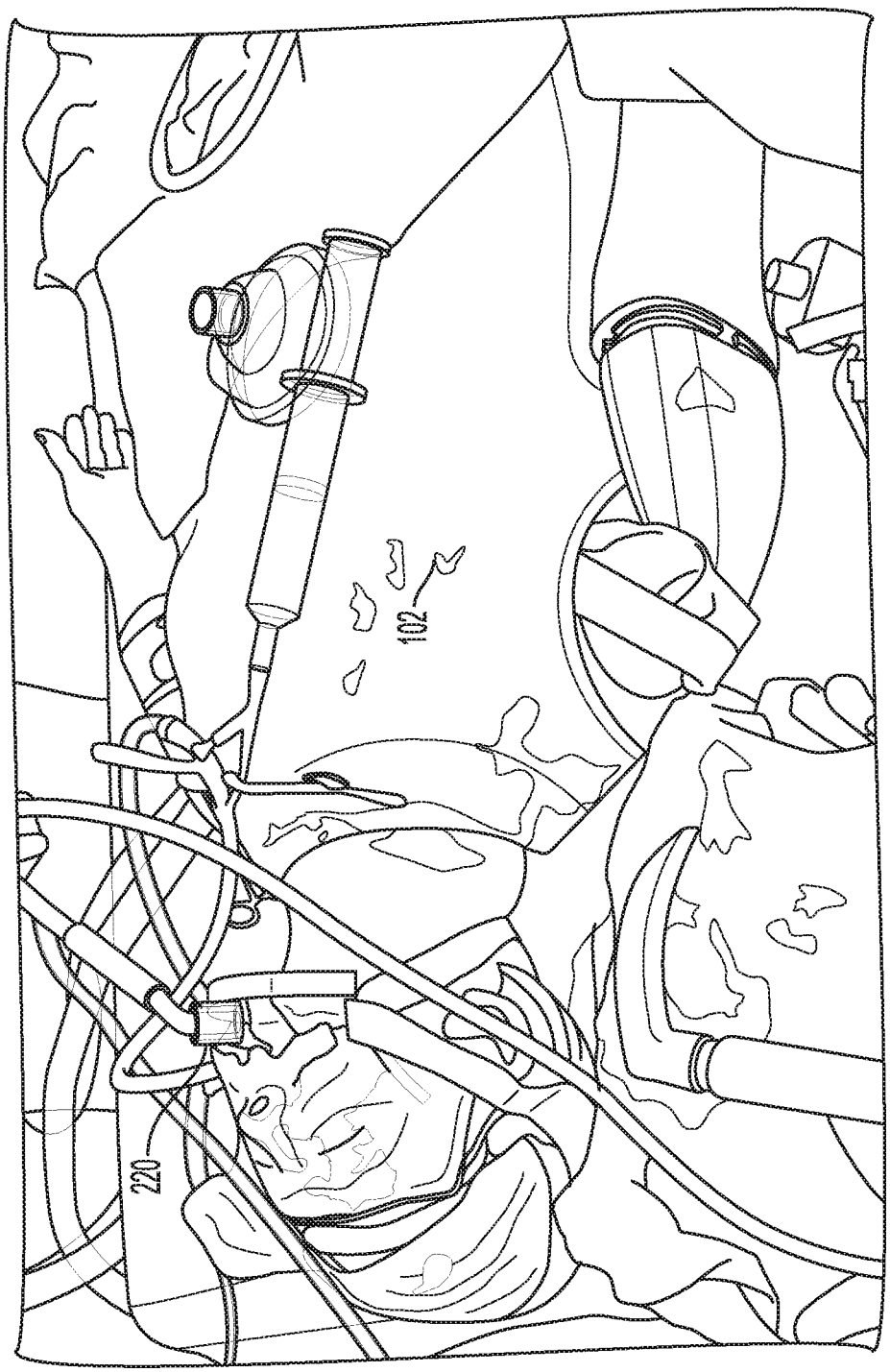
FIG. 6 is a perspective view of the manikin with a gastrointestinal tube inserted therein.

The oral aperture can be in communication with a simulated airway 130. In exemplary aspects, the simulated airway 130 can comprise a simulated esophagus 132 and a simulated larynx 134 that is positioned between the simulated esophagus 132 and the front 102 (FIG. 6) of the manikin 100. The simulated esophagus 132 can be configured to receive a gastrointestinal tube, such as, for example, a Minnesota tube 220 as is known in the art (FIG. 6). Optionally, the simulated esophagus can comprise an extension tube 133 that extends from a lower end (opposite the oral aperture) of the simulated airway 130. The extension tube 133 can provide a realistic length of an esophagus (e.g., 9-10 inches or more) to fully receive the Minnesota tube. Optionally, the simulated esophagus can have extra length (e.g., about six inches, about eight inches, about ten inches, or about twelve inches) in addition to the length corresponding to the esophagus in order to simulate a length of stomach in communication with the esophagus. The simulated airway 130 can further comprise one or a pair of simulated bronchial tubes 136 in communication with the simulated larynx 134. According to some aspects, the simulated airway can comprise a flexible material. The flexible material can enhance the fidelity of the simulated airway in comparison to a rigid material.

The manikin 100 can further comprise a torso 140. The torso 140 can house at least a portion of the simulated airway 130. The torso 140 can further house one or a pair of simulated lungs 142. The simulated lungs 142 can connect to the simulated bronchial tube(s) 136 via respective conduits 144 (e.g., lengths of tubing).

Figure 4:
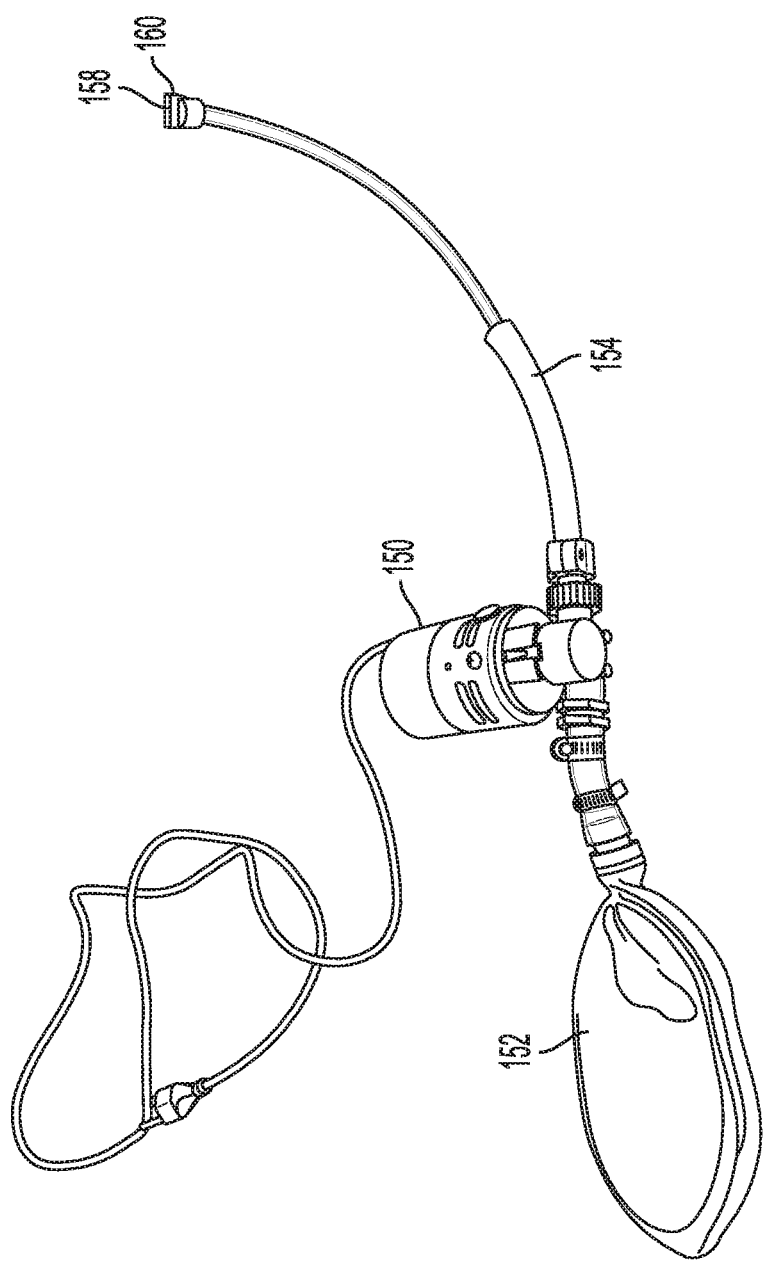
FIG. 4 is a perspective view of a pump system of the manikin of FIG. 1.
Figure 5:
FIG. 5 is a perspective view of the manikin simulating hematemesis in accordance with embodiments disclosed herein.
Figure 7:
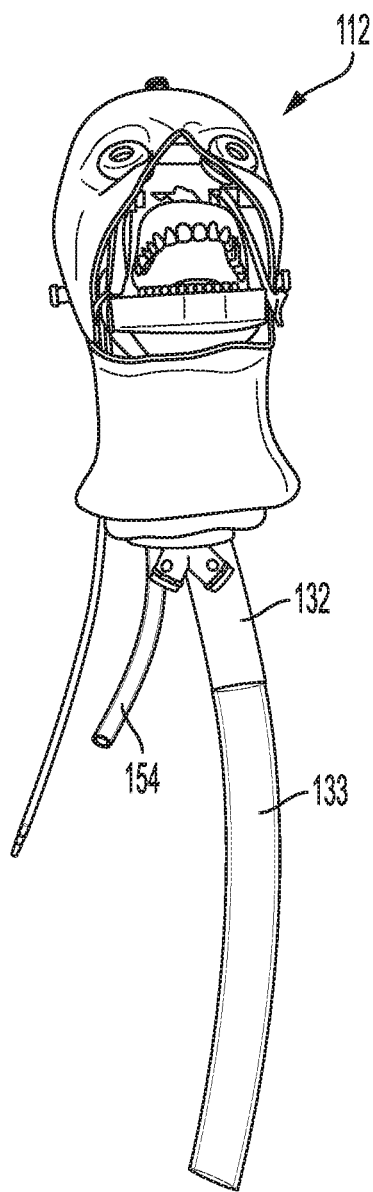
FIG. 7 is a perspective view of a portion of the manikin as in FIG. 1.
Figure 8:
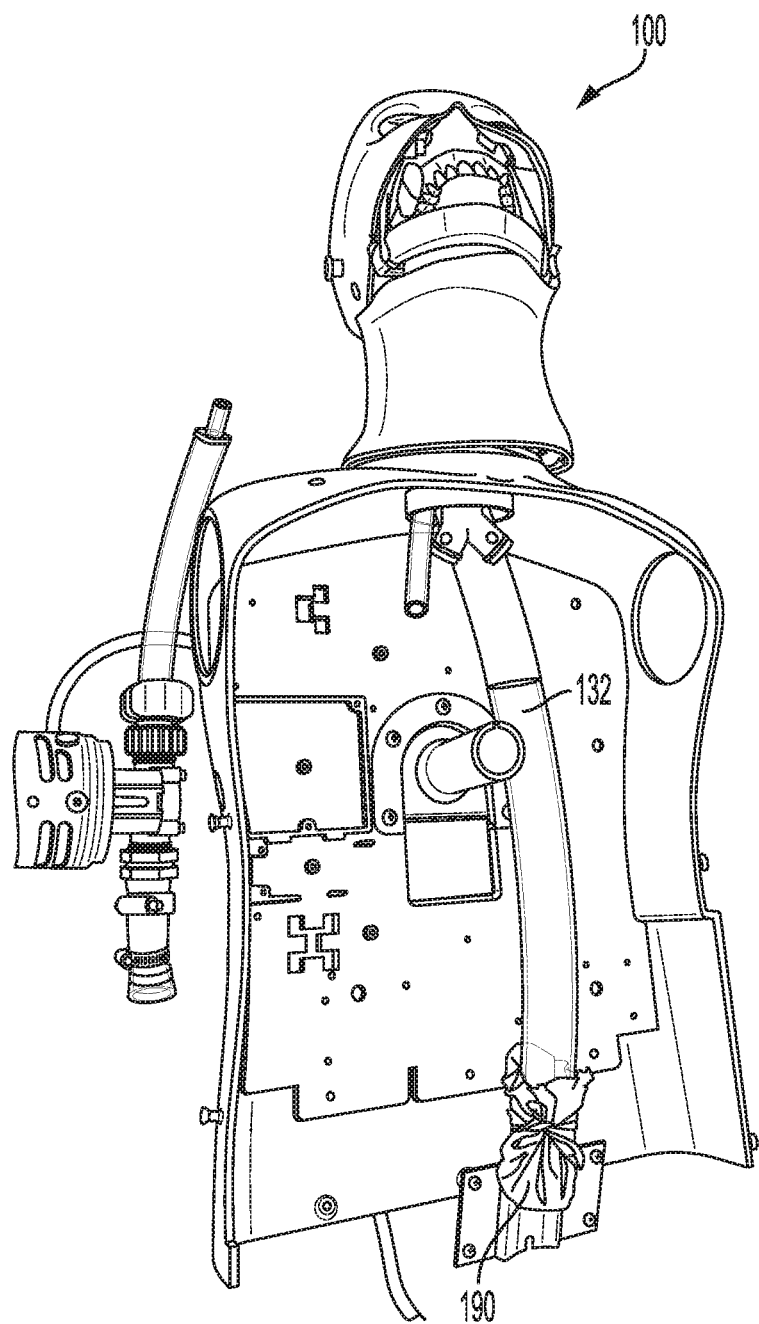
FIG. 8 is a perspective view of a portion of the manikin as in FIG. 1.
Figure 9:
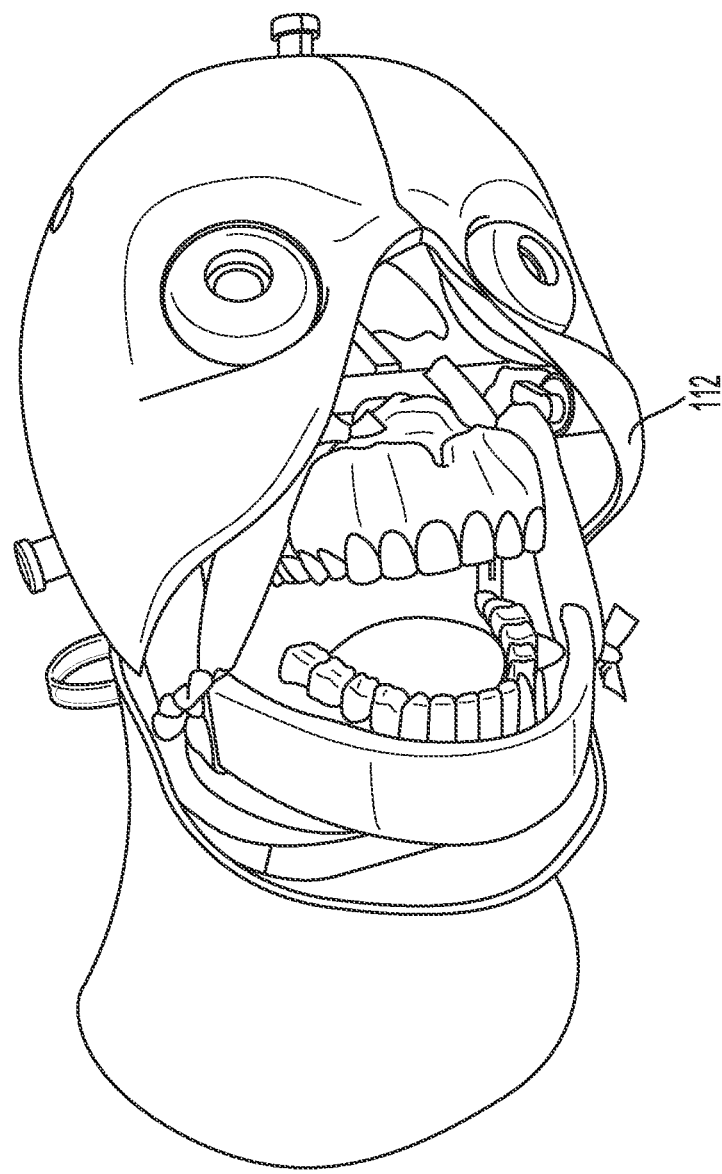
FIG. 9 is a perspective view of the head of the manikin as in FIG. 1.
Figure 10:
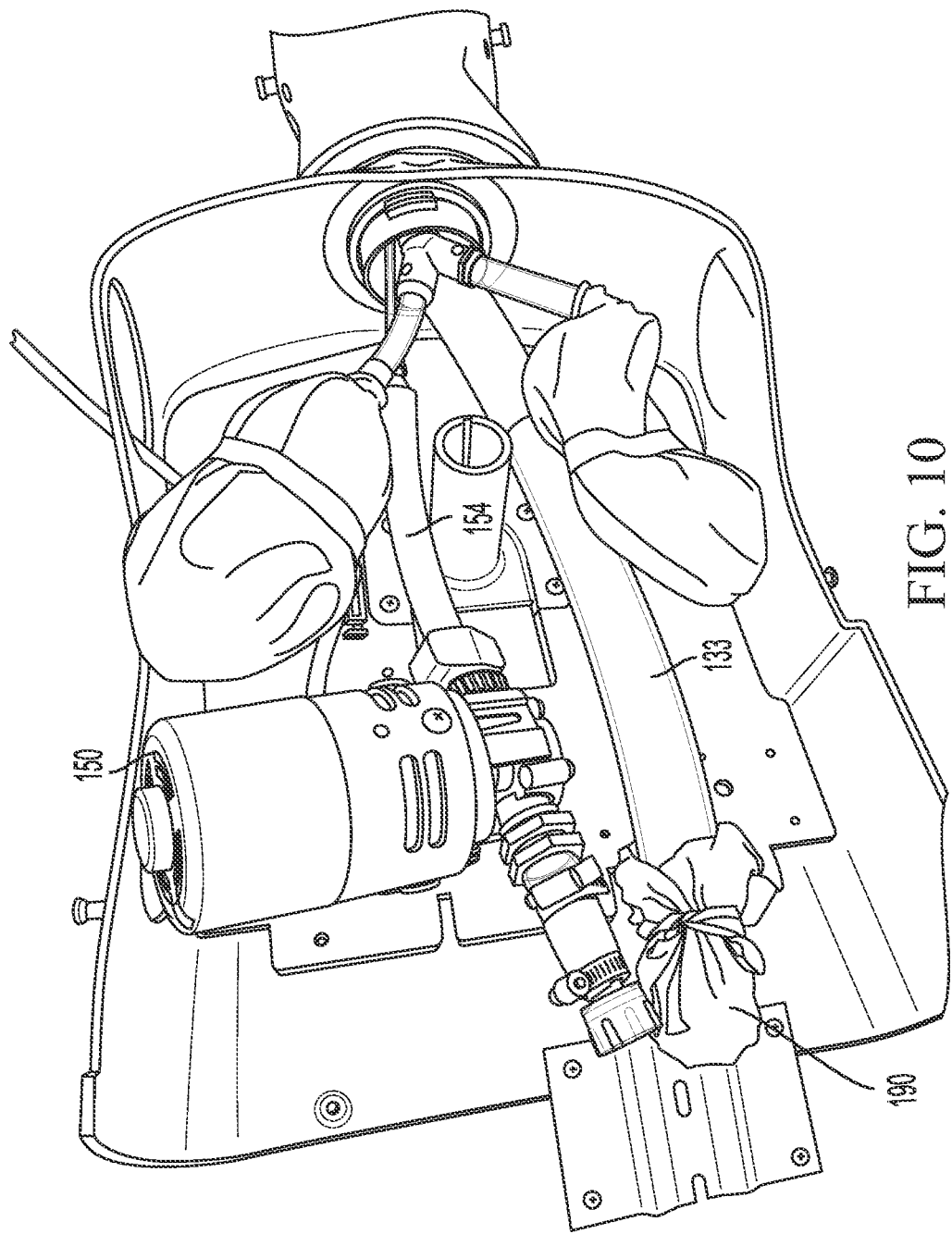
FIG. 10 is a perspective view of a portion of the manikin as in FIG. 1.
Figure 11:
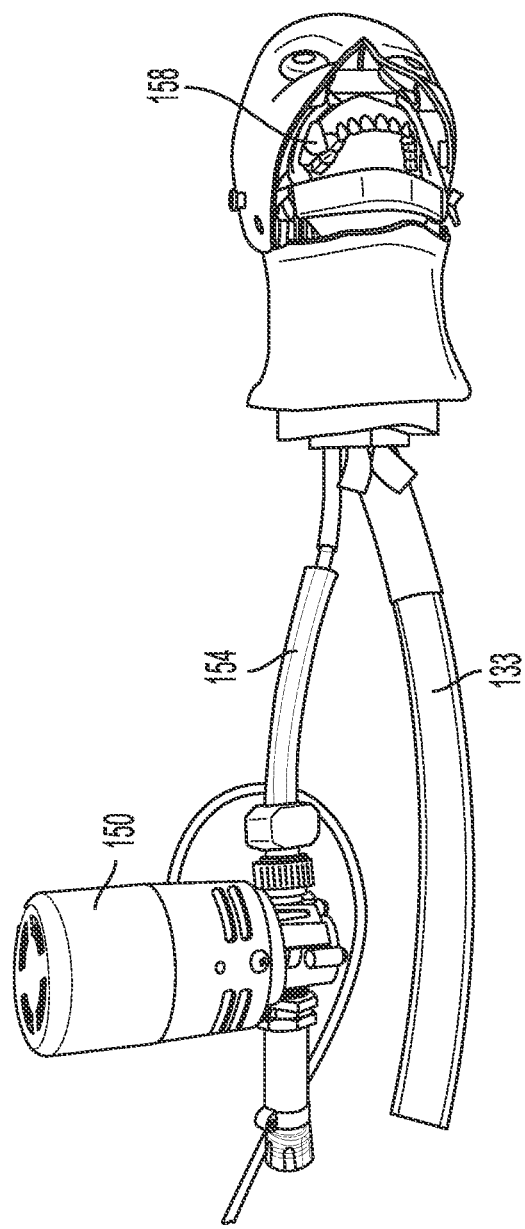
FIG. 11 is a perspective view of a portion of the manikin as in FIG. 1.
Figure 12:
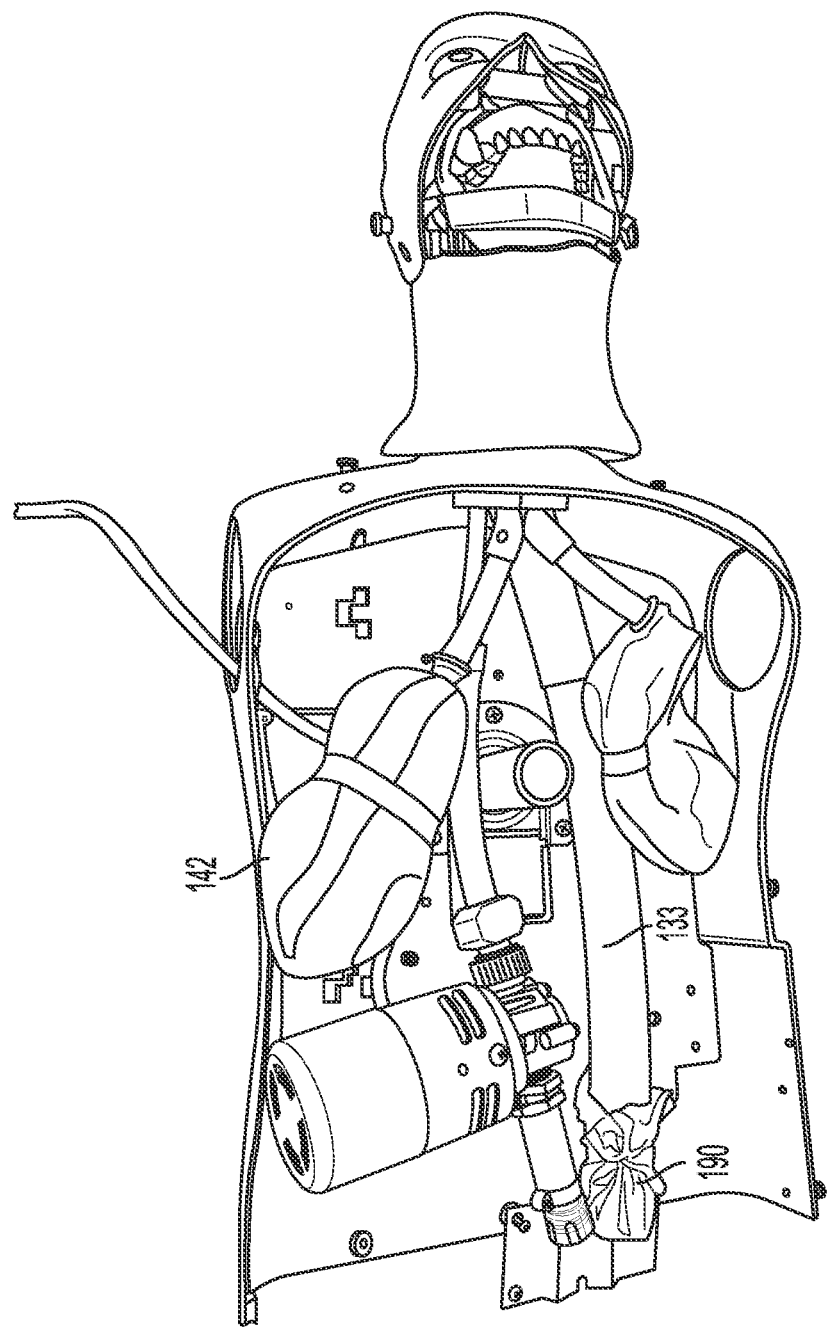
FIG. 12 is a perspective view of a portion of the manikin as in FIG. 1.
Figure 13:
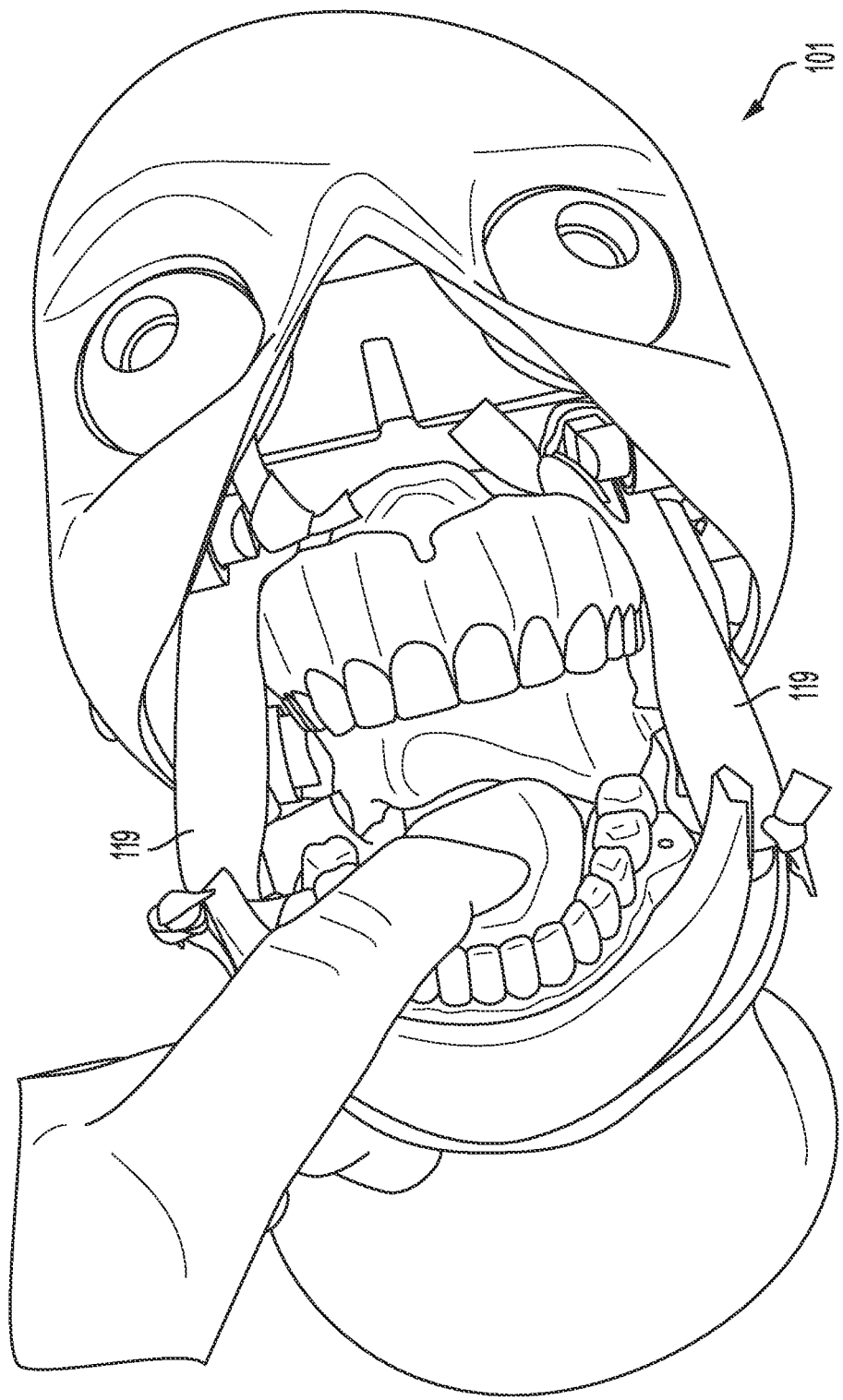
FIG. 13 is a perspective view of the head of the manikin as in FIG. 1.
Figure 14:
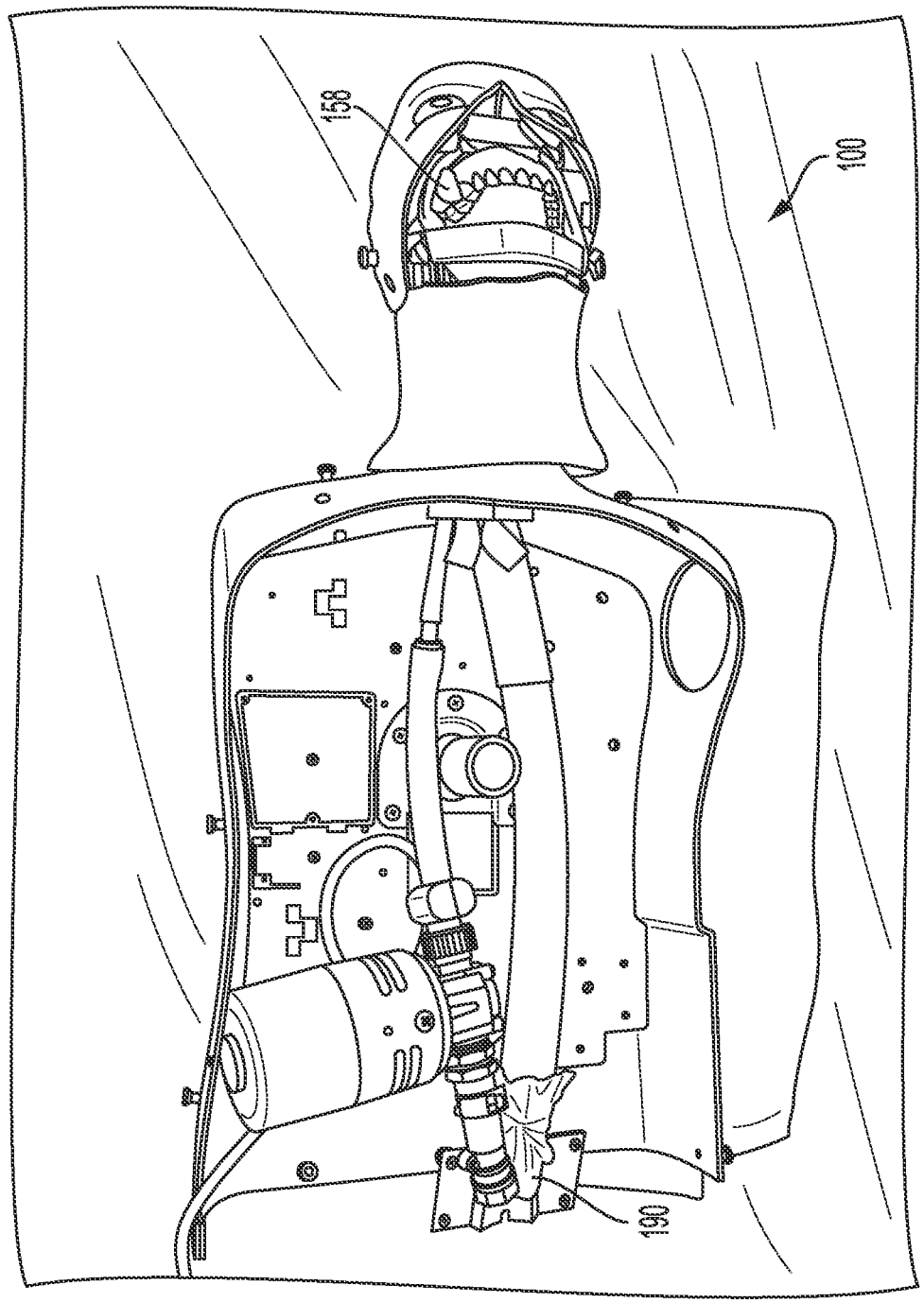
FIG. 14 is a perspective view of the manikin as in FIG. 1.
Figure 15:
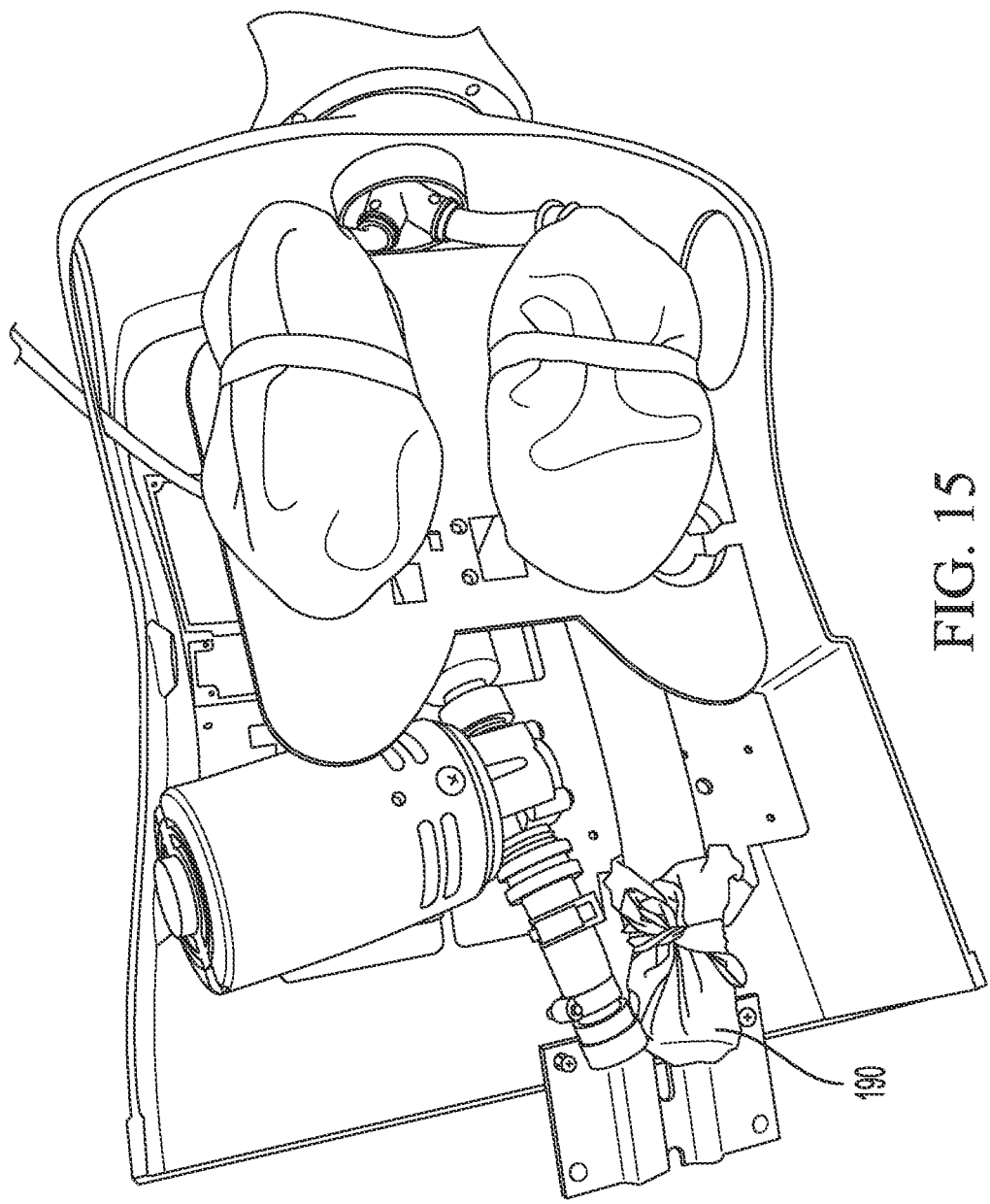
FIG. 15 is a perspective view of the torso of the manikin as in FIG. 1.

Referring to FIGS. 1 and 4, the training manikin 100 can further comprise a pump 150 that is in fluid communication with a reservoir 152. The pump 150 and the reservoir 152 can optionally be housed within the torso 140 of the manikin 100. Alternatively, one or both of the pump 150 and the reservoir 152 can be positioned external to the torso 140. The reservoir 152 can contain a fluid 156 (e.g., blood or simulated blood). Optionally, the simulated blood can comprise dyed water. In further aspects, the simulated blood can comprise various materials that simulate other blood characteristics, such as, for example, viscosity. A conduit 154 can extend from the pump 150 to an outlet 158 that is disposed at the oral aperture 114 of the head portion 112. The conduit 154 can optionally have oval cross sections in planes perpendicular to its length. The conduit 154 can optionally have a major diameter ranging from about 0.75 inches to about 3 inches (e.g., about 1.5 inches) and a length ranging from about 15 inches to about 35 inches (optionally, being about 22 inches). The conduit 154 can optionally comprise semi-rigid polymer. In further embodiments, the conduit 154 can be made of a soft, compressible material. Optionally, it is contemplated that an inflated Minnesota tube (or other gastrointestinal tube) within the simulated esophagus can compress or block the conduit 154 to inhibit flow therethrough. In further aspects, the conduit 154 does not extend through the simulated esophagus 132. Rather, as shown in FIG. 7, the conduit 154 can optionally extend alongside the simulated esophagus 132 to the oral aperture 114. Optionally, in these aspects, the conduit 154 can be spaced from the simulated esophagus 132. Alternatively, the conduit 154 can be in contact with the simulated esophagus 132.

Referring to FIGS. 1 and 4, in use, the pump 150 can be configured to pump the fluid 156 (optionally, simulated blood) from the reservoir 152 and to the outlet 158. The pump 150 can be configured to expel the fluid in a way that simulates hematemesis. For example, according to some optional aspects, the pump 150 can have sufficient pressure to project or expel the fluid at least ten inches or at least fifteen inches vertically, and at least fifteen, or at least twenty, or at least twenty five inches laterally from the oral cavity. In some embodiments, the pump 150 can have a flow rating of at least 250 gallons per minute and an output power of at least 0.5 horsepower (optionally, about 0.75 horsepower). Optionally, the pump 150 can have a flow rating ranging from about 250 gallons per minute to about 500 gallons per minute (optionally, ranging from about 300 to about 350 gallons per minute or being about 337 gallons per minute) and an output power ranging from about 0.75 horsepower to about two horsepower (optionally, being about one horsepower).

Referring to FIGS. 2-4, according to various embodiments, the outlet 158 of the conduit 154 can be positioned in various locations relative to the oral aperture 114. For example, the oral aperture 114 can define a throat portion 162, and the outlet 158 can be disposed at a back of the throat portion 162. In these embodiments, it is contemplated that the throat portion 162 can be configured to simulate the shape and appearance of a human throat. In further embodiments, as shown in FIG. 3, the outlet 158 can be disposed at or spaced from a side 164 of the oral aperture 114. In these embodiments, it is contemplated that the outlet 158 can be positioned to continue projecting or expelling fluid as a gastrointestinal tube is inserted within the simulated esophagus 132 through the oral aperture. In some aspects, it is contemplated that the outlet 158 can positioned so that continued projecting or expelling of fluid does not prevent the gastrointestinal tube from being inserted through the oral aperture during a training exercise. However, it is understood that some level of interference (by the expelled fluid) with insertion of the gastrointestinal tube may be desirable to simulate hematemesis conditions.

Optionally, a mesh screen 160 can cover the outlet 158 of the conduit 154. The mesh screen 160 can reduce the velocity of the fluid expulsion and spread the flow of fluid from the outlet 158, thereby providing a more life-like simulation of hematemesis. According to various aspects, a metal screen, a surgical mesh, or a piece of cloth (e.g., tech or sports material) can cover the outlet 158 for spreading the fluid and causing a pressure drop to constrain the expulsion velocity of the fluid.

Figure 16:
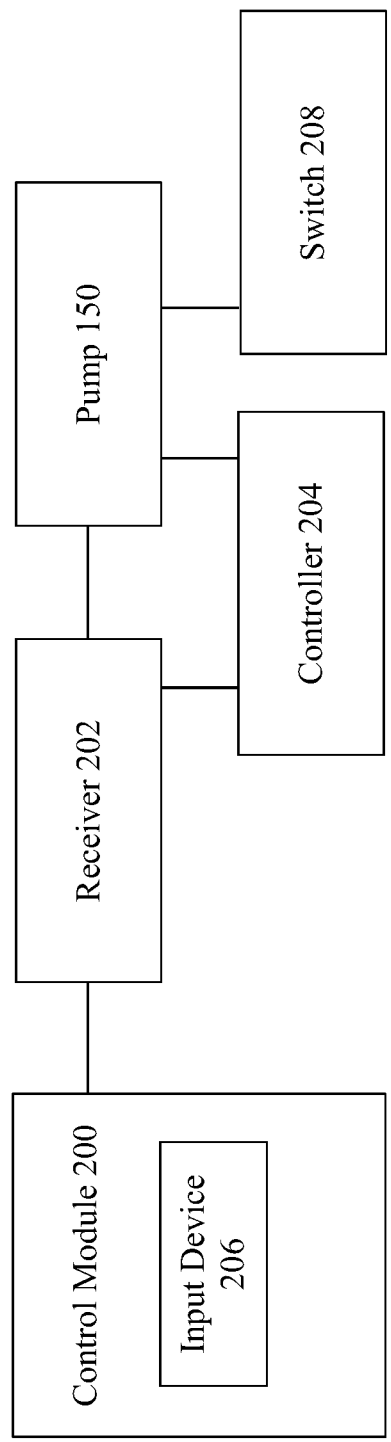
FIG. 16 is a schematic diagram depicting an exemplary system for controlling the pump of a manikin as disclosed herein.

Referring to FIG. 16, the pump 150 can be controlled remotely. That is, a control module 200 having an input device 206 (e.g., one or more buttons) can be in communication (e.g., wireless or wired electrical communication) with the pump 150. The control module 200 can provide a control signal to the pump to selectively cause the pump to start, stop, or modify the pumping of the liquid. In this way, an operator (e.g., a training professional) can cause the manikin 100 to simulate hematemesis condition. In some embodiments, the control module 200 is a power switch that is electrically coupled to the pump 150 (for example, via a wire). Accordingly, the control signal can comprise a provision of power to the motor or a cessation of power provision to the motor. That is, the operator can turn the motor on and off via the control module 200 (e.g., a power switch).

In some aspects, the control module 200 can be in communication with the pump 150 via a receiver 202 in communication with the pump. Optionally, in aspects in which the control signal is a provision of power, for example, the receiver 202 can be a portion of a circuit that powers the pump 150 (e.g., a power input to the pump). That is, the receiver 202 can be embodied as a portion of a power circuit of the pump 150 that receives power when the pump is on. Accordingly, in some optional embodiments, the control module 200 and receiver 202 can collectively be embodied by a circuit that provides power to the pump and comprises a power switch. Said power switch can optionally be integral to the pump 150 or otherwise be in electrical communication with the pump for selectively interrupting power to the pump. Optionally, in further embodiments, the control module 200 communicates via wired communication or wirelessly with the receiver 202 in communication with the pump 150. In these embodiments, it is contemplated that the control module 200 can comprise a remote control or a a remote computing device, such as, for example and without limitation, a laptop computer, a tablet, or a smartphone. It is further contemplated that the remote computing device can comprise a processor that is configured to execute an application program that is configured to provide wireless communication with the receiver 202, which can be communicatively coupled to a pump controller 204. Thus, when the receiver 202 receives instructions from the control module 200, the pump controller 204 can be configured to control operation of the pump 150 in accordance with the instructions provided by the control module.

In some embodiments, the pump 150 can be modulated to pump intermittently. Optionally, the operator can manually turn the pump on and off. According to further optional aspects, the pump controller 204 can provide a wave (e.g., a square wave) control signal to the pump that varies the pump output to produce intermittent streams of expelled fluid. In some embodiments, the pump can have a single pump power. Thus, the simulated blood flow rate can be constant or substantially constant. Thus, the amount of expelled fluid can depend on the duration that the pump is turned on. In further embodiments, the pump can be a variable flow pump. Thus, the operator can manually vary the output of the pump (e.g., via the control module 200), or, in further aspects, the controller 204 can vary the output of the pump. In further embodiments, the control module 200 comprises the controller 204.

In some embodiments, the pump 150 can be stopped based on a condition. In some embodiments, the condition can be the operator manually stopping operation of the pump 150 via the control module 200 (e.g., interrupting power to the pump). In further optional aspects, a switch 208 (e.g., a momentary switch) can be disposed within the simulated esophagus. Proper placement and inflation of the Minnesota tube can cause the Minnesota tube to engage (e.g., contact or displace) the switch 208, the engagement (e.g., contact or displacement) of which can cease operation of the pump 150.

A properly placed Minnesota tube or multiple port balloon tamponade device can be inserted so that the device extends about twenty inches to about twenty four inches (optionally, twenty-two to twenty-four inches) into the patient. In exemplary aspects, the tube can be about forty inches long. Optionally, when properly inserted, it is contemplated that the patient's teeth can be between length marks thirty-five and forty (cm) on the tube (or other tamponade device). Thus, in some aspects, it is contemplated that length marks thirty-five and forty can be about twenty-two to twenty-four inches from the end of the tube inserted into the patient. As is known in the art, the length marks of the tube typically begin on the side of the esophageal balloon of the tube that is closest to the clinician. The Minnesota tube can optionally be inserted with assistance of a video laryngoscopy. In further embodiments, the tube can be inserted without video assistance. When inserted, the Minnesota tube can extend from the top teeth to the end of the simulated esophagus.

In exemplary aspects, the bottom of the simulated esophagus 132 can be occluded with a cover 190, as shown in FIGS. 9, 11, 13, 15, and 16. Optionally, the cover 190 can comprise an elastic and/or expandable material, such as, for example, a medical glove or other receptacle that is capable of expansion and contraction (in response to a change in a volume of fluid within the receptacle). The cover can optionally hold a volume of fluid, such as, for example, simulated blood. Thus, after placing the Minnesota tube, the Minnesota tube can be used to aspirate the simulated blood in the cover 190. In this way, the trainee can practice insertion and use of the Minnesota tube.

Optionally, it is contemplated that the pump and other electrical components of the manikin 100 can be powered through at least one electrical cord having a plug that is configured to be received within a conventional electrical receptacle. Alternatively, it is contemplated that the manikin can comprise an internal power source (e.g., a battery) that is housed within a portion of the manikin. It is further contemplated that the internal power source can be rechargeable.

The manikin 100 can further comprise one or a pair of arms 180. The arms 180 can be configured to receive an IV. In these aspects, it is contemplated that the arms 180 can comprise material that can be readily punctured to simulate venous access. Additionally, or alternatively, the arms 180 can comprise a port that is configured for complementary engagement with an IV port as is known in the art.

In exemplary aspects, the electrical components of the manikin can be fluidly isolated from portions of the manikin that are exposed to potential contact with blood or simulated blood during use of the manikin as disclosed herein.

In some embodiments, the manikin 100 can comprise repurposed portions from another training manikin, such as, for example, a CPR manikin. Thus, in some embodiments, it is contemplated that the head portion 112, oral aperture 114, simulated teeth 116, simulated jaw 118, eyes 120, hair (or a hair-shaped component 122), nose 124, and/or the simulated airway 130 (including the simulated esophagus 132 and the simulated larynx 134) of the manikin can be repurposed from another manikin. Exemplary manikins having one or more components that can be repurposed as disclosed herein include those disclosed in U.S. Pat. Nos. 5,330,514, 5,823,787, 6,227,864, and 8,616,889, each of which is incorporated herein by reference in its entirety.

In some embodiments, the manikin 100 can be configured to simulate lung bleeding. A conduit can communicate simulated blood from a pump to the lung. The conduit can extend to the training lung. Optionally, the same pump can be used to deliver blood to the lung and/or to the mouth. For example, a valve manifold can select between communicating from the pump to the tube that extends to the mouth and from the pump to the tube that extends to the lung. In further embodiments, a separate pump can deliver simulated blood through the conduit that extends to the lung. The separate pump can be the same as, or similar to, the pump 150, and the separate pump can be configured for selective pumping in the same manner as disclosed with respect to pump 150. The separate pump can pump simulated blood from the same reservoir or from a separate reservoir. Optionally, it is contemplated that the manikin 100 can be used to simulate simultaneous bleeding from both the lungs and the mouth. In further embodiments, the lungs can be filled, or partially filled, with simulated blood (e.g., manually poured in) prior to beginning a training scenario. Thus, no pump is required to provide simulated blood to the lungs. In such embodiments, the trainee can, upon seeing the manikin expel blood, determine its origin (either the simulated lungs, the simulated esophagus/stomach, or both.

In further embodiments, the manikin can be a lung bleeding simulator, and the conduit that extends to the mouth and simulates hematemesis can be omitted.

Example Embodiment

Referring to FIGS. 1 and 2, in some embodiments, the manikin can comprise components of a LAERDAL RESUSCI ANNE manikin such as, for example, the head 102, simulated airway 130, and torso 140. An upper denture set can be inserted and affixed (e.g., via heat-polymerized acrylic) above the simulated airway 130 with respect to the longitudinal axis. Diatorics (i.e., artificial teeth) can be embedded in, or affixed to, a lower jaw portion of the simulated airway 130. An elastic material 119 (FIG. 13), such as a portion of a bicycle inner tube can flexibly couple the lower jaw portion to the upper denture.

In the chest cavity of the manikin, the chest compression spring can be removed. Simulated endotracheal tubing lengths can be cut and attached at first ends to bronchial endings of the simulated airway 130. Simulated lungs can be attached to opposing second ends of the simulated endotracheal tubing lengths. A LAERDAL IV arm trainer can be attached to a shoulder socket of the body, optionally on the right side of the body.

Remaining components in the chest cavity of the CPR manikin can be removed, including the bladder and other supporting structures. Similarly, the CPR manikin's legs can be removed. An eighteen inch long, 1.5 inch diameter tube can attach to the simulated esophagus of the simulated airway 130.

Referring to FIG. 4, the pump 150 can be a self-prime 115V TRANS pump made by Zoeller Pump Company having a maximum head height of thirty-nine feet. The pump's inlet can receive a ¾ inch NPT pipe fitting. A corresponding ¾ inch NPT pipe fitting can attach to a LAERDAL lung bag, which can be used as the reservoir 152. The pump's outlet can similarly receive a ¾ inch NPT pipe fitting. A corresponding ¾ inch NPT pipe fitting can attach a GlideRite 7.5 F endotracheal tube. Surgical mesh can be sewn over the outlet of the tube (i.e., the end of the tube opposite the pump).

The power cord of the pump can plug into a wirelessly controlled electrical outlet, such as, for example, a FOSMON wireless remote-control electrical outlet. A wireless remote can remotely turn the outlet on and off. Thus, the wireless remote can act as the control module 200, and the FOSMON wireless remote-control electrical outlet can operate as the receiver 202. In this way, the wireless remote can turn the pump on and off.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A training manikin having a front, a longitudinal axis, and a sagittal axis perpendicular to the longitudinal axis, the training manikin comprising: a head portion having an oral aperture; a simulated esophagus in communication with the oral aperture of the head portion, wherein the simulated esophagus is configured to receive a gastrointestinal tube; a simulated larynx positioned between the simulated esophagus and the front of the manikin relative to the sagittal axis; a reservoir configured to receive a liquid; a conduit in communication with the reservoir, wherein the conduit has an outlet end, wherein the outlet end of the conduit is positioned proximate to the oral aperture of the head portion; and a pump positioned between, and in communication with, the reservoir and the conduit, wherein the pump is configured to pump the liquid from the reservoir to the outlet end of the conduit, wherein the pump is configured to begin pumping upon a first condition.

Aspect 2: The training manikin of aspect 1, further comprising a mesh disposed at the outlet end of the conduit.

Aspect 3: The training manikin of aspect 1 or aspect 2, wherein the oral aperture of the head portion defines a simulated throat, wherein the outlet end of the conduit is positioned at a back of the simulated throat.

Aspect 4: The training manikin of aspect 1 or aspect 2, wherein the outlet end of the conduit is positioned at a side of the oral aperture.

Aspect 5: The training manikin of any of the preceding aspects, wherein the conduit comprises a tube that is sufficiently flexible so that inflation of the gastrointestinal tube inhibits flow of the liquid.

Aspect 6: The training manikin of any of the preceding aspects, further comprising the liquid within the reservoir, wherein the liquid is simulated blood.

Aspect 7: The training manikin of any of the preceding aspects, wherein the pump has a flow rating of at least 250 gallons per minute and a minimum power of at least 0.75 horsepower.

Aspect 8: The training manikin of aspect 7, wherein the pump has a flow rating of about 337 gallons per minute and a power output of about one horsepower.

Aspect 9: The training manikin of any of the preceding aspects, further comprising teeth disposed within the oral aperture of the head portion.

Aspect 10: The training manikin of any of the preceding aspects, further comprising a receiver, wherein the receiver is configured to receive a signal from a control module, wherein the first condition is a first user-initiated signal from the control module.

Aspect 11: The training manikin of aspect 10, wherein the pump is configured to terminate pumping upon a second condition.

Aspect 12: The training manikin of aspect 11, wherein the second condition is a second user-initiated signal from the control module.

Aspect 13: The training manikin of any of aspects 10-12, wherein the receiver is a wireless receiver.

Aspect 14: The training manikin of any of aspects 10-12, wherein the receiver is a wired receiver.

Aspect 15: The training manikin of any of the preceding aspects, wherein at least a portion of the manikin is repurposed from a CPR training manikin.

Aspect 16: The training manikin of any of the preceding aspects, further comprising a torso portion, wherein the simulated esophagus, the reservoir, and the pump are disposed within the torso portion.

Aspect 17: The training manikin of aspect 16, further comprising at least one arm that is attached to the torso, wherein the at least one arm is configured to receive an IV.

Aspect 18: The training manikin of any of the preceding aspects, wherein the simulated esophagus and the simulated larynx are both portions of a simulated airway, and wherein the simulated airway further comprises at least one bronchial tube.

Aspect 19: The training manikin of aspect 18, further comprising at least one simulated lung in communication with the at least one bronchial tube of the simulated airway.

Aspect 20: A system comprising: a manikin as in any of aspects 10-14; and a control module in communication with the receiver of the manikin.

Aspect 21: The system of aspect 20, wherein the control module comprises at least one input device that is configured to initiate the first user-initiated signal from the control module.

Aspect 22: A method of using the system of aspect 20 or aspect 21, wherein the method comprises: upon the first condition, using the pump to pump liquid from the reservoir to the outlet end of the conduit; and advancing a gastrointestinal tube within the simulated esophagus.

Aspect 23: The method of aspect 22, wherein the gastrointestinal tube is a Minnesota tube.

Aspect 24: The method of aspect 22 or aspect 23, wherein the liquid is pumped in a manner to simulate vomiting of blood.

Although the foregoing invention has been described in some detail by way of illustration and example for purposes of clarity of understanding, certain changes and modifications may be practiced within the scope of the appended claims.

What is claimed is:

1. A training manikin having a front, a longitudinal axis, and a sagittal axis perpendicular to the longitudinal axis, the training manikin comprising:
    a head portion having an oral aperture;
    a simulated esophagus in communication with the oral aperture of the head portion, wherein the simulated esophagus is configured to receive a gastrointestinal tube;
    a simulated larynx positioned between the simulated esophagus and the front of the manikin relative to the sagittal axis;
    a reservoir configured to receive a liquid;
    a conduit in communication with the reservoir, wherein the conduit has an outlet end, wherein the outlet end of the conduit is positioned proximate to the oral aperture of the head portion; and
    a pump positioned between, and in communication with, the reservoir and the conduit, wherein the pump is configured to pump the liquid from the reservoir to the outlet end of the conduit, wherein the pump is configured to begin pumping upon a first condition.

2. The training manikin of claim 1, further comprising a mesh disposed at the outlet end of the conduit.

3. The training manikin of claim 1, wherein the oral aperture of the head portion defines a simulated throat, wherein the outlet end of the conduit is positioned at a back of the simulated throat.

4. The training manikin of claim 1, wherein the training manikin has a sagittal plane that includes the longitudinal axis and the sagittal axis, wherein the outlet end of the conduit is positioned at a side of the oral aperture that is offset from the sagittal plane.

5. The training manikin of claim 1, further comprising the liquid within the reservoir, wherein the liquid is simulated blood.

6. The training manikin of claim 1, wherein the pump has a flow rating of at least 250 gallons per minute and a minimum power of at least 0.75 horsepower.

7. The training manikin of claim 1, further comprising teeth disposed within the oral aperture of the head portion.

8. The training manikin of claim 1, further comprising a receiver, wherein the receiver is configured to receive a signal from a control module, wherein the first condition is a first user-initiated signal from the control module.

9. The training manikin of claim 8, wherein the pump is configured to terminate pumping upon a second condition.

10. The training manikin of claim 9, wherein the second condition is a second user-initiated signal from the control module.

11. The training manikin of claim 8, wherein the receiver is a wireless receiver.

12. The training manikin of claim 8 wherein the receiver is a wired receiver.

13. The training manikin of claim 1, wherein at least a portion of the manikin is repurposed from a CPR training manikin.

14. The training manikin of claim 1, further comprising at least one arm that is attached to a torso, wherein the at least one arm is configured to receive an IV.

15. The training manikin of claim 1, wherein the simulated esophagus and the simulated larynx are both portions of a simulated airway, and wherein the simulated airway further comprises at least one bronchial tube.

16. The training manikin of claim 15, further comprising at least one simulated lung in communication with the at least one bronchial tube of the simulated airway.

17. The training manikin of claim 1, wherein the training manikin is configured to expel the liquid outwardly from the oral aperture.

18. A system comprising:
    a control module; and
    a training manikin having a front, a longitudinal axis, and a sagittal axis perpendicular to the longitudinal axis, the training manikin comprising:
        a head portion having an oral aperture;
        a simulated esophagus in communication with the oral aperture of the head portion, wherein the simulated esophagus is configured to receive a gastrointestinal tube;
        a simulated larynx positioned between the simulated esophagus and the front of the manikin relative to the sagittal axis;
        a reservoir configured to receive a liquid;
        a conduit in communication with the reservoir, wherein the conduit has an outlet end, wherein the outlet end of the conduit is positioned proximate to the oral aperture of the head portion;
        a pump positioned between, and in communication with, the reservoir and the conduit, wherein the pump is configured to pump the liquid from the reservoir to the outlet end of the conduit, wherein the pump is configured to begin pumping upon a first condition, and wherein the pump is configured to terminate pumping upon a second condition; and
        a receiver, wherein the receiver is configured to receive a signal from the control module, wherein the first condition is a first user-initiated signal from the control module and wherein the second condition is a second user-initiated signal from the control module.

19. A method comprising:
    causing a pump to pump liquid from a reservoir to an outlet end of a conduit of a training manikin, the training manikin having a front, a longitudinal axis, and a sagittal axis perpendicular to the longitudinal axis, the training manikin comprising:
    a head portion having an oral aperture;
    a simulated esophagus in communication with the oral aperture of the head portion, wherein the simulated esophagus is configured to receive a gastrointestinal tube;

a simulated larynx positioned between the simulated esophagus and the front of the manikin relative to the sagittal axis;

the reservoir having the liquid therein;

the conduit, wherein the conduit is in communication with the reservoir, wherein the outlet end of the conduit is positioned proximate to the oral aperture of the head portion; and the pump positioned between, and in communication with, the reservoir and the conduit.

20. The method of claim 19, further comprising: causing the pump to cease pumping liquid from the reservoir.

* * * * *